United States Patent
Gajendran et al.

(10) Patent No.: US 10,303,785 B2
(45) Date of Patent: May 28, 2019

(54) OPTIMIZING ONLINE SCHEMA PROCESSING FOR BUSY DATABASE OBJECTS

(71) Applicant: INTERNATIONAL BUSINESS MACHINES CORPORATION, Armonk, NY (US)

(72) Inventors: Vasu Gajendran, Indiranagar (IN); Sriram Lakshminarasimhan, Chennai (IN); Ramesh C. Pathak, Bangalore (IN); Suryanarayana K. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 14/822,273

(22) Filed: Aug. 10, 2015

(65) Prior Publication Data
US 2017/0046364 A1 Feb. 16, 2017

(51) Int. Cl.
*G06F 16/00* (2019.01)
*G06F 17/30* (2006.01)

(52) U.S. Cl.
CPC .. *G06F 17/30292* (2013.01); *G06F 17/30368* (2013.01); *G06F 17/30371* (2013.01); *G06F 17/30595* (2013.01)

(58) Field of Classification Search
CPC ......... G06F 17/30292; G06F 17/30368; G06F 17/30371; G06F 17/30595
See application file for complete search history.

(56) References Cited

U.S. PATENT DOCUMENTS

| 5,758,357 | A | 5/1998 | Barry et al. |
| 6,519,613 | B1 | 2/2003 | Friske et al. |
| 7,970,748 | B2 | 6/2011 | Romine et al. |
| 8,015,155 | B2 | 9/2011 | Langley et al. |
| 8,306,978 | B2 | 11/2012 | Bower et al. |

(Continued)

OTHER PUBLICATIONS

Online reorganization enhancements in Oracle 12c; Julian Dontcheff's Database Blog; URL: https://juliandontcheff.wordpress.com/2014/03/27/online-reorganization-enhancements-in-oracle-12c/; retrieved from the Internet Feb. 24, 2015; 4 pages.

*Primary Examiner* — Etienne P Leroux
*Assistant Examiner* — Husam Turki Samara
(74) *Attorney, Agent, or Firm* — Schmeiser, Olsen & Watts; Mark C. Vallone

(57) ABSTRACT

An approach is provided for managing a reorganization of a database object. Because a reorganization utility cannot acquire exclusive access to the object to complete the reorganization, determinations are made: an amount of transaction log records corresponding to active units of work using the database object is determined to be less than a first threshold; a sum of costs of SQL statements executed in the units of work is determined to be less than a second threshold; and a priority of the reorganization is determined to indicate a greatest priority among multiple priorities. Based on the determinations, (1) a reorganization lock providing exclusive access to the database object is acquired, (2) process(es) holding lock(s) on the database object experience a lockout error, a rollback of the process (es) is issued, and the lock(s) are released, and (3) the utility completes the reorganization based on the lock(s) being released.

20 Claims, 4 Drawing Sheets

(56) References Cited

U.S. PATENT DOCUMENTS

| | | |
|---|---|---|
| 8,639,657 B2 | 1/2014 | Wangelien |
| 9,342,351 B1* | 5/2016 | Dee ........................ G06F 9/466 |
| 2008/0154918 A1* | 6/2008 | Iwatsu ............. G06F 17/30297 |
| 2013/0275367 A1 | 10/2013 | Shuma et al. |
| 2014/0089253 A1* | 3/2014 | Mansur ................ G06F 17/303 |
| | | 707/609 |
| 2016/0085777 A1* | 3/2016 | Engelko ............ G06F 17/30292 |
| | | 707/803 |

* cited by examiner

OPTIMIZING ONLINE SCHEMA PROCESSING FOR BUSY DATABASE OBJECTS

TECHNICAL FIELD

The present invention relates to managing database objects, and more particularly to managing a reorganization or redefinition of database objects.

BACKGROUND

With each new release of a relational database management system (RDBMS) product, the number of tasks that can be performed online without an outage are steadily increasing. Certain tasks still require a small window of exclusive access for their completion. A very busy object may never obtain a window of time during which access to the object can be exclusively assigned to a single process. As a result, tasks such as the ones listed below may never be performed without a scheduled outage window:
- Online reorganization of database objects (e.g., tablespace, tables, and indexes)
- Online database table changes such as adding a column, deleting a column, and changing a data type
- Online parameter changes to database objects
- Online rename of a database table, column, or index
- Online tablespace type changes
- Redefinition of database objects Reorganization and redefinition of database objects such as tablespace, tables, and index using reorganization (REORG) and redefinition utilities must be performed routinely for space reclamation (e.g., holes created by DELETEs), to restore data clustering order to improve performance of SQL queries, to enable compression to meet business requirements and many more depending on the database management system (DBMS) and business requirements.

There are known online reorganization and redefinition utilities, which allow read/write activity during the reorganization or redefinition, that offer availability, but that need a small window of exclusive access during which no processes are allowed to the tablespace. A very busy tablespace may never obtain a window of low update activity where access to the tablespace can be completely drained. The threads accessing the table may either have to complete or will have to be terminated for the REORG or redefinition utility to successfully complete. As a result, an opportunity to perform critical reorganizations and redefinitions may never materialize.

Most reorganization (REORG) and redefinition utilities perform their functions in phases. Exclusive access (i.e., an outage phase) is required at the final phase of the operation of the REORG or redefinition utility. In a known approach, the problem of the exclusive access requirement is addressed by deferring the outage phase through parameters on the online REORG or redefinition utility. A facility is provided to dynamically alter the parameters of the utility to allow the REORG utility to enter the outage phase at an optimal time determined by database administrators (DBAs). Limitations of the aforementioned known approach include: (1) manual intervention by the DBAs being required and (2) some busy tablespaces never having an idle period during which an exclusive lock can be manually granted. In another known approach, parameters are provided to unconditionally force out the processes accessing the tablespace and database objects before the REORG or redefinition utility enters the outage phase, thereby allowing the utility to complete its operation. The forcefully terminated processes can cause potential issues with an application and is never a preferred method and therefore is not allowed by the owners of the application. As a result of using the known approaches, the online REORG or redefinition activities fail to acquire an exclusive lock on the object and therefore fail. Similar problems arise for the other online tasks listed above. Accordingly, there is a need for a technique to ensure successful completion of the aforementioned tasks that require a small window of exclusive access.

BRIEF SUMMARY

In a first embodiment, the present invention provides a method of managing an online processing of a schema of a database object. The method includes a computer determining a utility performing the online processing of the schema of the database object is unable to acquire a time period of an exclusive access to the database object for a completion of the online processing of the schema. The method further includes in response to the step of determining the utility is unable to acquire the time period of the exclusive access to the database object, the computer determining an amount of transaction log records corresponding to active units of work using the database object. The method further includes subsequent to the step of determining the amount of transaction log records, the computer determining the amount of transaction log records is less than a first threshold value. The method further includes in response to the step of determining the utility is unable to acquire the time period of the exclusive access to the database object, the computer determining a sum of costs of respective SQL statements executed in the active units of work using the database object. The method further includes subsequent to the step of determining the sum of the costs, the computer determining the sum of the costs is less than a second threshold value. The method further includes in response to the step of determining the utility is unable to acquire the time period of the exclusive access, the computer determining a priority value assigned to the online processing of the schema. The method further includes subsequent to the step of determining the priority value, the computer determining the priority value equals a predetermined priority value among a plurality of priority values. The method further includes based on the amount of transaction log records being less than the first threshold value, the sum of the costs being less than the second threshold value, and the priority value equaling the predetermined priority value, the computer (1) acquiring a lock on a tablespace of the database object so that the utility has the lock on the tablespace, (2) based on the acquired lock, releasing one or more locks that respective one or more processes hold on the database object, which provides the utility with the exclusive access to the database object, and (3) determining the utility performs the completion of the online processing of the schema based on the utility having the acquired lock and the exclusive access and based on the one or more locks being released.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of managing an online processing of a schema of a database object. The method includes the computer system determining a utility performing the online processing of the schema of the database object is unable to acquire a time period of an exclusive access to the database object for a completion of the online processing of the schema. The method further includes in response to the step of determining the utility is unable to acquire the time period of the exclusive access to the database object, the computer system determining an amount of transaction log records corresponding to active units of work using the database object. The method further includes subsequent to the step of determining the amount of transaction log records, the computer system determining the amount of transaction log records is less than a first threshold value. The method further includes in response to the step of determining the utility is unable to acquire the time period of the exclusive access to the database object, the computer system determining a sum of costs of respective SQL statements executed in the active units of work using the database object. The method further includes subsequent to the step of determining the sum of the costs, the computer system determining the sum of the costs is less than a second threshold value. The method further includes in response to the step of determining the utility is unable to acquire the time period of the exclusive access, the computer system determining a priority value assigned to the online processing of the schema. The method further includes subsequent to the step of determining the priority value, the computer system determining the priority value equals a predetermined priority value among a plurality of priority values. The method further includes based on the amount of transaction log records being less than the first threshold value, the sum of the costs being less than the second threshold value, and the priority value equaling the predetermined priority value, the computer system (1) acquiring a lock on a tablespace of the database object so that the utility has the lock on the tablespace, (2) based on the acquired lock, releasing one or more locks that respective one or more processes hold on the database object, which provides the utility with the exclusive access to the database object, and (3) determining the utility performs the completion of the online processing of the schema based on the utility having the acquired lock and the exclusive access and based on the one or more locks being released.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of managing an online processing of a schema of a database object. The method includes the computer system determining a utility performing the online processing of the schema of the database object is unable to acquire a time period of an exclusive access to the database object for a completion of the online processing of the schema. The method further includes in response to the step of determining the utility is unable to acquire the time period of the exclusive access to the database object, the computer system determining an amount of transaction log records corresponding to active units of work using the database object. The method further includes subsequent to the step of determining the amount of transaction log records, the computer system determining the amount of transaction log records is less than a first threshold value. The method further includes in response to the step of determining the utility is unable to acquire the time period of the exclusive access to the database object, the computer system determining a sum of costs of respective SQL statements executed in the active units of work using the database object. The method further includes subsequent to the step of determining the sum of the costs, the computer system determining the sum of the costs is less than a second threshold value. The method further includes in response to the step of determining the utility is unable to acquire the time period of the exclusive access, the computer system determining a priority value assigned to the online processing of the schema. The method further includes subsequent to the step of determining the priority value, the computer system determining the priority value equals a predetermined priority value among a plurality of priority values. The method further includes based on the amount of transaction log records being less than the first threshold value, the sum of the costs being less than the second threshold value, and the priority value equaling the predetermined priority value, the computer system (1) acquiring a lock on a tablespace of the database object so that the utility has the lock on the tablespace, (2) based on the acquired lock, releasing one or more locks that respective one or more processes hold on the database object, which provides the utility with the exclusive access to the database object, and (3) determining the utility performs the completion of the online processing of the schema based on the utility having the acquired lock and the exclusive access and based on the one or more locks being released.

Embodiments of the present invention ensure successful completion of REORG and redefinition jobs, thereby improving the performance of business critical applications that depend on the frequent reorganization and redefinition of busy objects. Embodiments presented herein provide an automated and dynamic process in which a thread analyzer grants to REORG and redefinition utilities a novel exclusive lock on actively used objects, thereby avoiding a significant amount of time of monitoring and intervention by a database administrator to ensure completion of the reorganization and redefinition. Embodiments of the present invention provide usefulness during emergency changes which require exclusive access on busy objects.

DETAILED DESCRIPTION

Overview

Embodiments of the present invention allow a process of an online REORG or redefinition utility to succeed at a reorganization or a redefinition of a database object when multiple threads are using the database object. An intelligent agent intervenes when the REORG or redefinition utility is unable to acquire a window of exclusive access for completion of the operation of the utility. The intelligent agent dynamically and continuously identifies existing active processes that are accessing the object in shared or exclusive mode and also estimates the amount of work completed by all of these active processes and the cost of work completed by each of these active processes. Based on the amount of work completed, the cost of work completed, and the priority of the REORG or redefinition utility, the intelligent agent optimally determines a time to free up the locks from the identified processes and in response, allocate an exclusive lock to the online REORG or redefinition utility. At the determined optimal time, the intelligent agent releases the locks and assigns an exclusive lock to the REORG or redefinition utility to allow the utility to complete its operation.

System for Managing an Online Processing of a Schema of a Database Object

Figure 1:
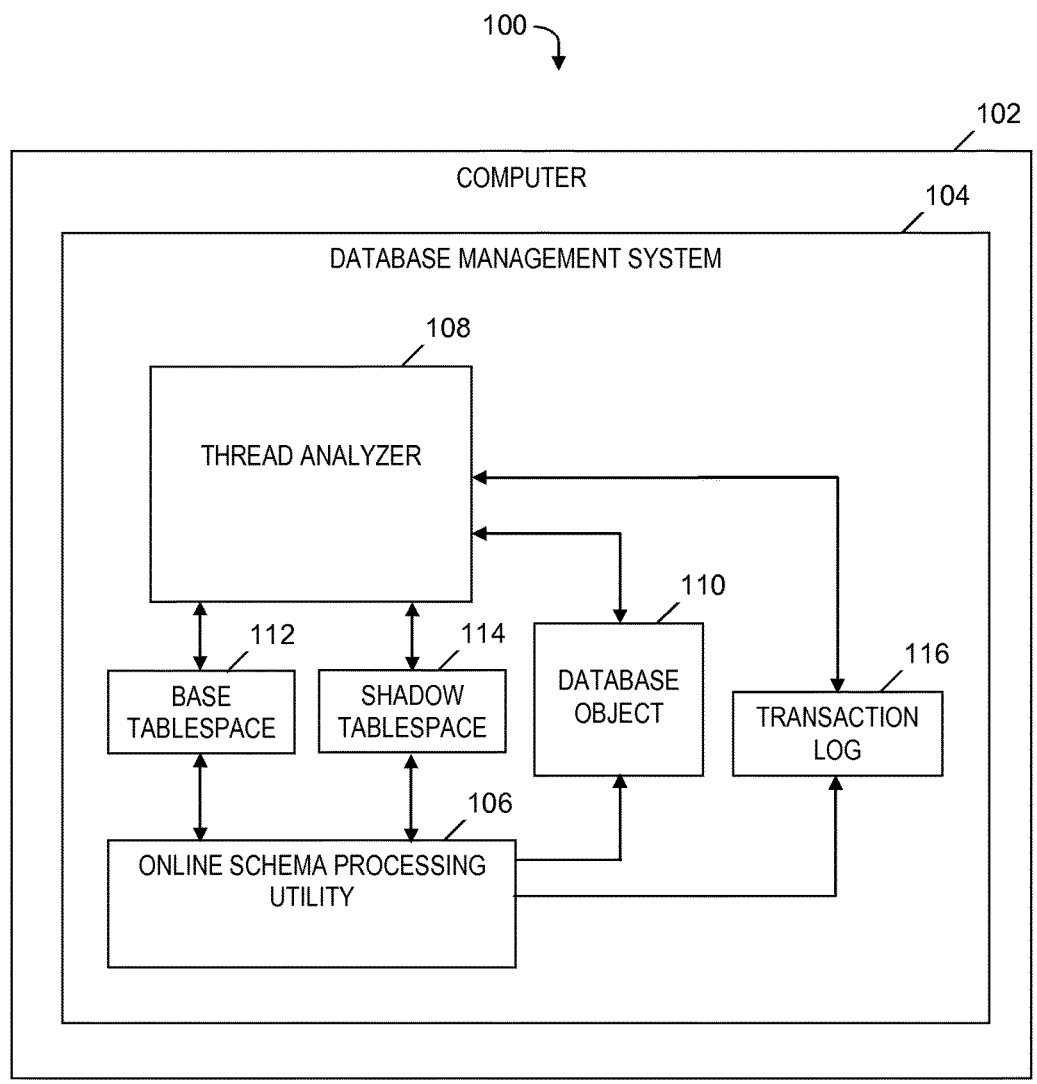
FIG. 1 is a block diagram of a system for managing an online processing of a schema of a database object, in accordance with embodiments of the present invention.

FIG. 1 is a block diagram of a system 100 for managing an online processing of a schema of a database object, in accordance with embodiments of the present invention. System 100 includes a computer 102, which includes a database management system (DBMS) 104, which includes a software-based online schema processing utility 106 and a software-based thread analyzer 108, which are executed by computer 102. Online schema processing utility 106 performs an online schema processing of a database object 110, which requires a window (i.e., period of time) during which utility 106 has exclusive access of database object 110. For example, online schema processing utility 106 is a REORG utility that performs a reorganization of database object 110, which is a database table, database index, or a tablespace. As other examples, the online schema processing of database object 110 may include an online table change (e.g., addition or deletion of a database column, or changing a data type of a database column), an online parameter change to database object 110, an online renaming of a database table, column, or index, an online tablespace type change, or a redefinition of database object 110.

Thread analyzer 108 is a novel intelligent agent that intervenes in response to a determination that online schema processing utility 106 is unable to acquire the window of exclusive access to database object 110 in order to complete the operation of utility 106. Thread analyzer 108 dynamically and continuously identifies active processes that are accessing database object 110 in shared or exclusive mode, estimates the amount of work done by the identified active processes, and estimates the cost of work done by the active transactions of the identified active processes. Thread analyzer 108 determines an optimal time to release the locks of the identified active processes (i.e., the locks on database object 110) and allocate a novel, exclusive lock to the online schema processing utility 106, where the exclusive lock provides utility 106 with exclusive access to database object 110 and the tablespace of database object 110. At the optimal time, thread analyzer 108 releases the locks of the active processes and assigns the exclusive lock to the online schema processing utility 106.

Online schema processing utility 106 unloads data from a base tablespace 112 underlying database object 114 and loads the unloaded data into a shadow tablespace 114. DBMS 104 records in a transaction log 116 the write changes included in transactions of the identified active processes. After the release of the locks, online schema processing utility 106 applies changes that had been recorded in transaction log 116 to shadow tablespace 114, and subsequently, switches the base tablespace 112 and shadow tablespace 114.

The functionality of the components shown in FIG. 1 is described in more detail in the discussion of FIGS. 2A-2B, FIG. 3, and FIG. 4 presented below.

Process for Managing an Online Processing of a Schema of a Database Object

Figure 2A:
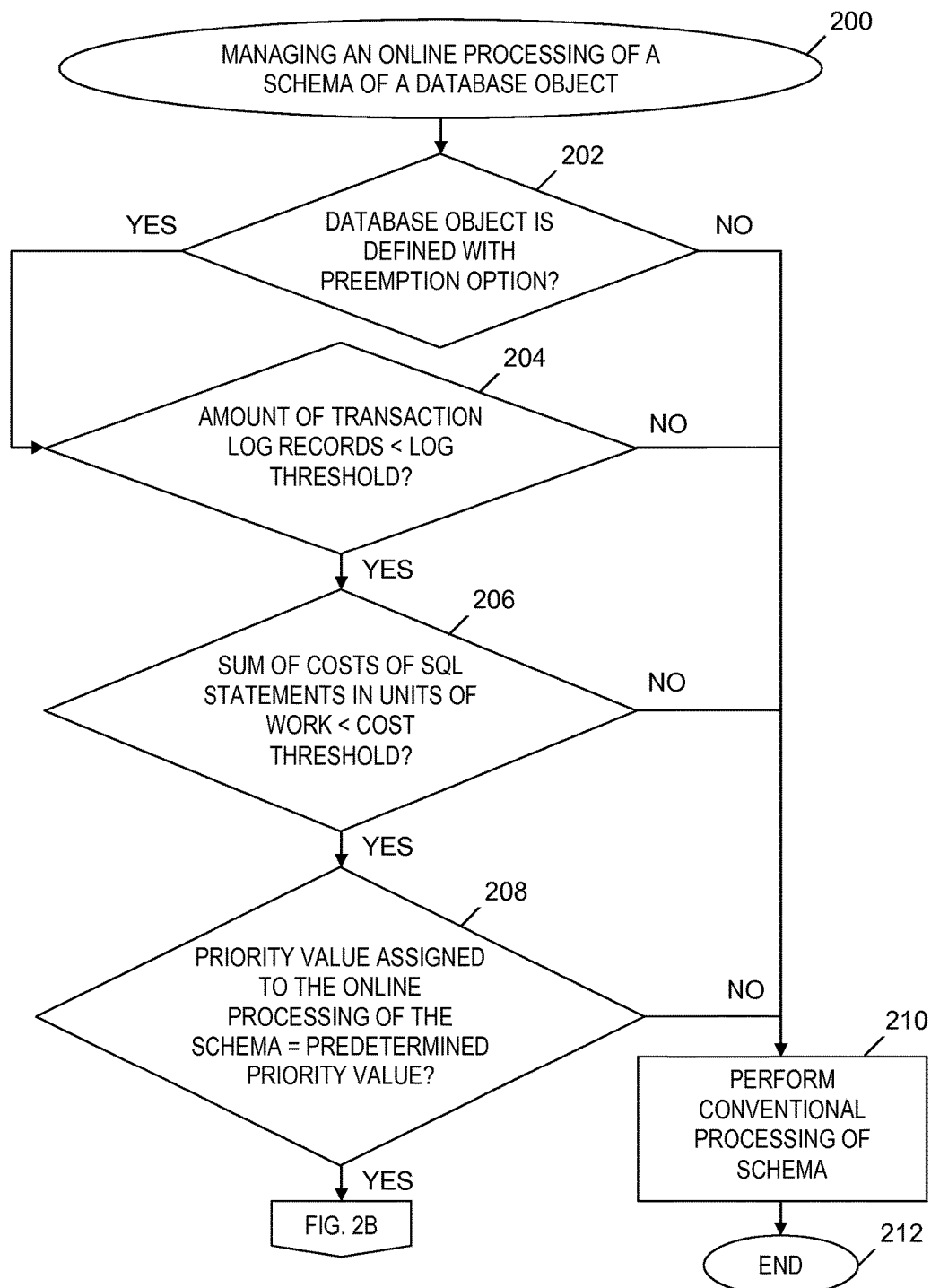
FIGS. 2A-2B depict a flowchart of a process of managing an online processing of a schema of a database object where the process is implemented in the system of FIG. 1, in accordance with embodiments of the present invention.
Figures 2B, 3:
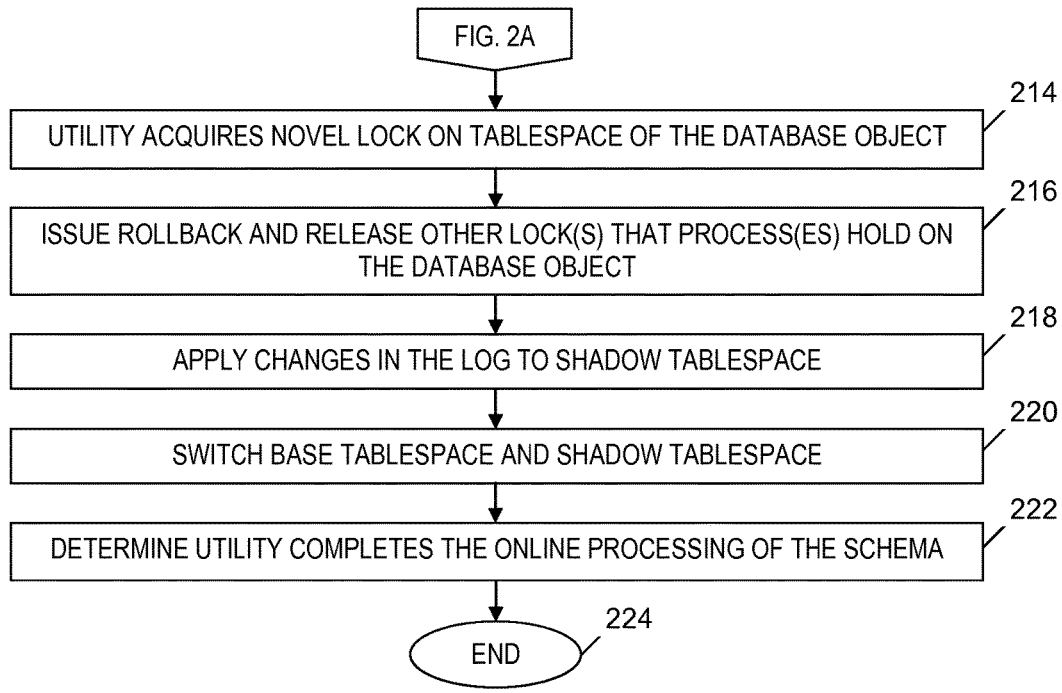
FIG. 3 is an example of code of an algorithm that is executed in the process of FIGS. 2A-2B, in accordance with embodiments of the present invention.

FIGS. 2A-2B depict a flowchart of a process of managing an online processing of a schema of database object 110 (see FIG. 1), where the process is implemented in the system of FIG. 1, in accordance with embodiments of the present invention. The process of managing an online processing of a schema of database object 110 (see FIG. 1) begins at step 200 in FIG. 2A. Prior to step 202, computer 102 (see FIG. 1) determines that online schema processing utility 106 (see FIG. 1) is unable to acquire a time period of exclusive access to database object 110 (see FIG. 1) in order to complete the online processing of the schema of database object 110 (see FIG. 1).

In step 202, thread analyzer 108 (see FIG. 1) determines whether database object 110 (see FIG. 1) is defined with a preemption option, which allows thread analyzer 108 (see FIG. 1) to release lock(s) that other process(es) hold on database object 110 (see FIG. 1), and to apply the novel lock on database object 110 (see FIG. 1), which allows thread analyzer 108 (see FIG. 1) to have exclusive access to database object 110 (see FIG. 1) to perform a reorganization or a redefinition of the schema of database object 110 (see FIG. 1). If thread analyzer 108 (see FIG. 1) determines in step 202 that database object 110 (see FIG. 1) is defined with the preemption option, then the Yes branch of step 202 is taken and step 204 is performed.

In step 204, in response to the determination that the online schema processing utility 106 (see FIG. 1) is unable to acquire the time period of exclusive access to database object 110 (see FIG. 1) and the determination in step 202 that database object 110 (see FIG. 1) is defined with a preemption option, thread analyzer 108 (see FIG. 1) determines an amount of transaction log records in transaction log 116 (see FIG. 1) which were recorded as a result of respective active units of work that utilize database object 110 (see FIG. 1), and subsequently, determines whether the amount of transaction log records is less than a first threshold value (i.e., predetermined log threshold). In one embodiment, the determination of the amount of transaction log records in step 204 is a calculation of the effort required to perform a rollback of active threads accessing database object 110 (see FIG. 1). If thread analyzer 108 (see FIG. 1) determines in step 204 that the amount of transaction log records is less than the log threshold, then the Yes branch of step 204 is taken and step 206 is performed.

The active units of work are included in a process executed by DBMS 104 (see FIG. 1). A unit of work is a set of one or more SQL statements that perform an update on database object 110 (see FIG. 1). If database object 110 is a database table, the update ends with either a COMMIT or a ROLLBACK. Every update results in the acquisition of exclusive locks on affected rows or pages of the table. The exclusive locks facilitate keeping the affected row or page clean and free of corruption by another process. All updates to tables are recorded in transaction log 116 (see FIG. 1). The starting point of a unit of work is the first update the transaction makes on the table. The end point of the unit of work is either a COMMIT or a ROLLBACK. In response to a COMMIT being issued, the updates done on the table are made permanent. In response to a ROLLBACK being issued, the updates done on a table are reversed. Both a COMMIT and a ROLLBACK release held locks.

In one embodiment, in step 204, thread analyzer 108 (see FIG. 1) determines the amount of transaction log records in transaction log 116 (see FIG. 1), which were recorded as a result of respective active units of work that utilize database object 110 (see FIG. 1), by reading only log ranges in transaction log 116 (see FIG. 1). The log ranges indicate transactions by which updates to database object 110 (see FIG. 1) happened. The reading of log ranges may be facilitated by reading a log ranges table.

In step 206, in response to the determination that the online schema processing utility 106 (see FIG. 1) is unable to acquire the time period of exclusive access to database object 110 (see FIG. 1), the determination in step 202 that database object 110 (see FIG. 1) is defined with a preemption option, and the determination in step 204 that the amount of transaction log records is less than the log threshold, thread analyzer 108 (see FIG. 1) determines a sum of costs of respective SQL statements executed in the active units of work that utilize database object 110 (see FIG. 1), and subsequently, determines whether the sum of the costs of the SQL statements is less than a second threshold value (i.e., a cost threshold). In one embodiment, the determination of the sum of costs in step 206 is a calculation of the cost required to perform a rollback of active threads accessing database object 110 (see FIG. 1). If thread analyzer 108 (see FIG. 1) determines in step 206 that the sum of the costs of the SQL statements is less than the cost threshold, then the Yes branch of step 206 is taken and step 208 is performed. The sum of the costs includes the CPU cost and the input/output (I/O) cost.

In step 208, in response to the determination that the online schema processing utility 106 (see FIG. 1) is unable to acquire the time period of exclusive access to database object 110 (see FIG. 1), the determination in step 202 that database object 110 (see FIG. 1) is defined with a preemption option, the determination in step 204 that the amount of transaction log records is less than the log threshold, and the determination in step 206 that the sum of the costs of the SQL statements is less than the cost threshold, thread analyzer 108 (see FIG. 1) determines a priority value of the online processing of the schema of database object 110 (see FIG. 1), where computer 102 (see FIG. 1) assigns the priority value to the online processing of the schema prior to step 208. Also in step 208, subsequent to determining the priority value, thread analyzer 108 (see FIG. 1), determines whether the priority value is equal to a predetermined priority value included in a group of predetermined priority values. For example, if the predetermined priority values are 1, 2, and 3, where 1 indicates a greatest level of priority, 2 indicates a middle level of priority, and 3 indicates a lowest level of priority, and if the threshold priority value is 1, then step 208 includes determining whether the priority value is equal to 1. In another embodiment, thread analyzer 108 (see FIG. 1) determines whether the priority value is included in a predetermined range of priority values that represent levels of priority that are greater than the level of priority of at least one other priority value. The determination of whether the priority value equals a predetermined priority value or is included in a range of priority values in step 208 ensures that the online processing of the schema has been assigned a high priority (i.e., a priority that is greater than or equal to a predetermined priority threshold).

If thread analyzer 108 (see FIG. 1) in step 208 determines that the priority value equals the predetermined priority value (or in the other embodiment, determines that the priority value is included in the predetermined range of priority values), then the Yes branch of step 208 is taken and the process continues in FIG. 2B, which is described after the discussion of steps 210 and 212.

Returning to step 202, if thread analyzer 108 (see FIG. 1) determines that database object 110 (see FIG. 1) is not defined with the preemption option, then the No branch of step 202 is taken and step 210 is performed. In step 210, computer 102 (see FIG. 1) performs a conventional processing of the schema of database object 110 (see FIG. 1), which includes draining the process threads that read or write to database object 110 (see FIG. 1) as changes in transaction log 116 (see FIG. 1) are applied on shadow tablespace 114 (see FIG. 1), and switching base tablespace 112 (see FIG. 1) and shadow tablespace 114 (see FIG. 1) after all the threads are drained. After step 210, the process of FIGS. 2A-2B ends at step 212.

Returning to the Yes branch of step 208, the process of FIGS. 2A-2B continues with step 214 in FIG. 2B. Steps 214, 216, 218, 220 and 220 are performed based on the (i) the amount of transaction log records being less than the log threshold as determined in step 204 (see FIG. 2A), (ii) the sum of the costs being less than the cost threshold as determined in step 206 (see FIG. 2A), and (iii) the priority value being the predetermined priority value as determined in step 208 (see FIG. 2A).

In step 214, thread analyzer 108 (see FIG. 1) acquires a lock on shadow tablespace 114 (see FIG. 1) of database object 110 (see FIG. 1), so that online schema processing utility 106 (see FIG. 1) has the acquired lock on shadow tablespace 114 (see FIG. 1).

In step 216, thread analyzer 108 (see FIG. 1) issues a rollback for all active threads (i.e., one or more threads) that are accessing database object 110 (see FIG. 1) and releases other lock(s) that process(es) of the thread(s) hold on database object 110 (see FIG. 1). By releasing the other lock(s), the online schema processing utility 106 (see FIG. 1) obtains exclusive access to database object 110 (see FIG. 1) and is able to reach the concluding phase of the online schema processing.

In step 218, thread analyzer 108 (see FIG. 1) applies changes that were recorded in transaction log 116 (see FIG. 1) to shadow tablespace 114 (see FIG. 1).

In step 220, thread analyzer 108 (see FIG. 1) switches base tablespace 112 (see FIG. 1) and shadow tablespace 114 (see FIG. 1).

Prior to step 222, online schema processing utility 106 (see FIG. 1) completes the online processing of the schema of database object 110 (see FIG. 1). In step 222, thread analyzer 108 (see FIG. 1) determines that online schema processing utility 106 (see FIG. 1) completes the online processing of the schema of database object 110 (see FIG. 1). The completion of the online processing of the schema is based in part on (i) online schema processing utility 106 (see FIG. 1) having the lock acquired in step 214, and (ii) the other lock(s) being released in step 216.

Following step 222, the process of FIGS. 2A-2B ends at step 224.

EXAMPLE

FIG. 3 is an example of code of an algorithm 300 that is executed in the process of FIGS. 2A-2B, in accordance with embodiments of the present invention. In an embodiment in which the online schema processing is a reorganization or a redefinition of database object 110 (see FIG. 1), a new type of lock is introduced. The new type of lock can be acquired only by an online reorganization or redefinition process. Acquiring the new type of lock provides the reorganization or redefinition process with exclusive access to the tablespace of database object 110 (see FIG. 1). Any other process with an intention to read or write can access the tablespace of database object 110 (see FIG. 1) only if the reorganization or redefinition process has not acquired the new type of lock on the tablespace. Once an online reorganization or redefinition process acquires the new type of lock on the tablespace, each of the other processes holding a lock on the tablespace of database object 110 (see FIG. 1) experience a lockout error accompanied by a rollback, which results in a release of all locks held by that process. The process is not canceled. The process still has an opportunity to redo the updates in the unit of work. In response to all locks on the tablespace of database object 110 (see FIG. 1) being successfully cleared out, utility 106 (see FIG. 1) performing the reorganization or redefinition has the opportunity to close out its final phase of execution successfully.

Algorithm 300 illustrates thread analyzer 108 (see FIG. 1) acquiring the new type of lock (i.e., the REORG_LOCK) if the amount of log records corresponding to each unit of work is less than or equal to the threshold TA_LOG_THRESHOLD, the sum of the costs of the SQL statements executed in the units of work is less than or equal to the threshold TA_COST_THRESHOLD, and the priority value associated with the reorganization (i.e., REORG_PRIORITY) is equal to the value of 1.

Thread analyzer 108 (see FIG. 1) obtains the amount of log records corresponding to each unit of work by examining the log ranges during which database object 110 (see FIG. 1) is updated. Thread analyzer 108 (see FIG. 1) estimates the cost of the SQL statements by utilizing an RDBMS optimizer to choose the least cost access path.

Computer System

Figure 4:
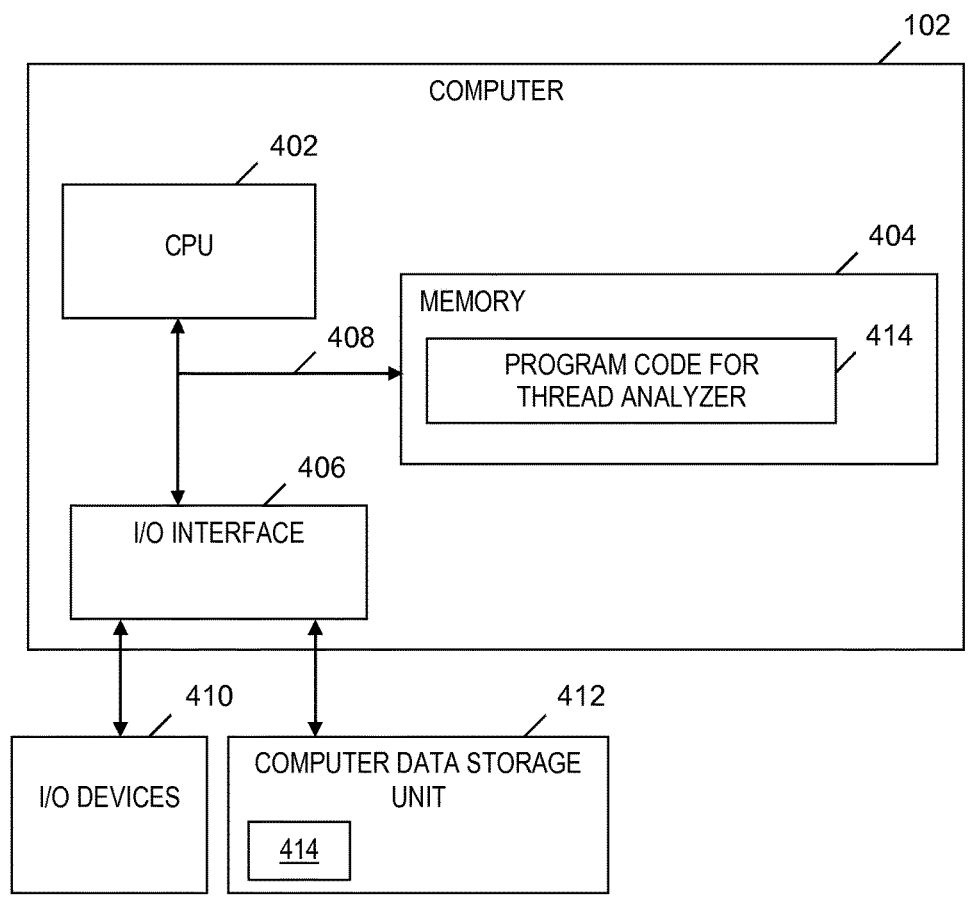
FIG. 4 is a block diagram of a computer that is included in the system of FIG. 1 and that implements the process of FIGS. 2A-2B, in accordance with embodiments of the present invention.

FIG. 4 is a block diagram of a computer that is included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 to perform a method of managing an online processing of a schema of a database object, where the instructions are carried out by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are carried out. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to manage an online processing of a schema of a database object. Although FIG. 4 depicts memory 404 as including program code 414, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may store base transaction log 116 (see FIG. 1), base tablespace 112 (see FIG. 1), shadow tablespace 114 (see FIG. 1), and database object 110 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to managing an online processing of a schema of a database object. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to manage an online processing of a schema of a database object. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing an online processing of a schema of a database object.

While it is understood that program code 414 for managing an online processing of a schema of a database object may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing an online processing of a schema of a database object. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing an online processing of a schema of a database object, the method comprising the steps of:
   a computer determining a utility performing the online processing of the schema of the database object is unable to acquire a time period of an exclusive access to the database object for a completion of the online processing of the schema;
   in response to the step of determining the utility is unable to acquire the time period of the exclusive access to the database object, the computer determining an amount of transaction log records corresponding to active units of work using the database object, and subsequent to the step of determining the amount of transaction log records, the computer determining the amount of transaction log records is less than a first threshold value;
   in response to the step of determining the utility is unable to acquire the time period of the exclusive access to the database object, the computer determining a sum of costs of respective SQL statements executed in the active units of work using the database object, and subsequent to the step of determining the sum of the costs, the computer determining the sum of the costs is less than a second threshold value;
   in response to the step of determining the utility is unable to acquire the time period of the exclusive access, the computer determining a priority value assigned to the online processing of the schema, and subsequent to the step of determining the priority value, the computer determining the priority value equals a predetermined priority value among a plurality of priority values; and
   based on the amount of transaction log records being less than the first threshold value, the sum of the costs being less than the second threshold value, and the priority value equaling the predetermined priority value, the computer (1) acquiring a lock on a tablespace of the database object so that the utility has the lock on the tablespace, (2) based on the acquired lock, releasing one or more locks that respective one or more processes hold on the database object, which provides the utility with the exclusive access to the database object, and (3) determining the utility performs the completion of the online processing of the schema based on the utility having the acquired lock and the exclusive access and based on the one or more locks being released.

2. The method of claim 1, further comprising the step of subsequent to acquiring the lock, the computer determining a lockout error on the one or more processes holding the one or more locks on the database object and issuing a rollback of the one or more processes, wherein the step of releasing the one or more locks is based in part on the lockout error and the issued rollback.

3. The method of claim 1, further comprising the step of based on the amount of the transaction log records being less than the first threshold value, the sum of the costs being less than the second threshold value, and the priority value equaling the predetermined priority value, the computer determining an optimal time to perform the step of releasing the one or more locks, wherein the step of releasing the one or more locks on the database object is performed at the optimal time.

4. The method of claim 1, further comprising:
   the computer determining the database object is defined with a preemption parameter indicating the utility is permitted to preempt the active units of work using the database so that the utility performs the online processing of the schema,
   wherein the steps of determining the amount of the transaction log records, determining the sum of the costs of the SQL statements, and determining the priority value assigned to the online processing of the schema are performed in response to the step of determining the database object is defined with the preemption parameter.

5. The method of claim 1, further comprising the step of based on the lock on the tablespace of the database object being acquired, the computer preventing a process from accessing the tablespace and (1) performing a read from the database object or (2) performing a write to the database object, wherein the prevented process attempts to access the tablespace to perform a read from the database object or a write to the database object, and wherein the prevented process is other than a process performing the online processing of the schema of the database object.

6. The method of claim 1, wherein the step of determining the amount of the transaction log records includes examining log ranges during which the database object is updated.

7. The method of claim 1, wherein the step of determining the sum of the costs of the SQL statements executed in the active units of work includes estimating a cost of an SQL statement by a selection of a least cost access path by an optimizer of a relational database management system.

8. The method of claim 1, further comprising the step of:
   providing at least one support service for at least one of creating, integrating, hosting, maintaining, and deploying computer-readable program code in the computer, the program code being executed by a processor of the computer to implement the steps of determining the utility is unable to acquire the time period, determining the amount of transaction log records, determining the amount of transaction log records is less than the first threshold value, determining the sum of the costs of the SQL statements, determining the sum of the costs is less than the second threshold value, determining the priority value, determining the priority value equals the predetermined priority value, acquiring the lock, releasing the one or more locks, and determining the utility performs the completion of the online processing of the schema.

9. A computer program product, comprising:
a computer-readable, storage device; and
a computer-readable program code stored in the computer-readable, storage device, the computer-readable program code containing instructions that are executed by a central processing unit (CPU) of a computer system to implement a method of managing an online processing of a schema of a database object, the method comprising the steps of:
  the computer system determining a utility performing the online processing of the schema of the database object is unable to acquire a time period of an exclusive access to the database object for a completion of the online processing of the schema;
  in response to the step of determining the utility is unable to acquire the time period of the exclusive access to the database object, the computer system determining an amount of transaction log records corresponding to active units of work using the database object, and subsequent to the step of determining the amount of transaction log records, the computer system determining the amount of transaction log records is less than a first threshold value;
  in response to the step of determining the utility is unable to acquire the time period of the exclusive access to the database object, the computer system determining a sum of costs of respective SQL statements executed in the active units of work using the database object, and subsequent to the step of determining the sum of the costs, the computer system determining the sum of the costs is less than a second threshold value;
  in response to the step of determining the utility is unable to acquire the time period of the exclusive access, the computer system determining a priority value assigned to the online processing of the schema, and subsequent to the step of determining the priority value, the computer system determining the priority value equals a predetermined priority value among a plurality of priority values; and
  based on the amount of transaction log records being less than the first threshold value, the sum of the costs being less than the second threshold value, and the priority value equaling the predetermined priority value, the computer system (1) acquiring a lock on a tablespace of the database object so that the utility has the lock on the tablespace, (2) based on the acquired lock, releasing one or more locks that respective one or more processes hold on the database object, which provides the utility with the exclusive access to the database object, and (3) determining the utility performs the completion of the online processing of the schema based on the utility having the acquired lock and the exclusive access and based on the one or more locks being released.

10. The computer program product of claim 9, wherein the method further comprises the step of subsequent to acquiring the lock, the computer system determining a lockout error on the one or more processes holding the one or more locks on the database object and issuing a rollback of the one or more processes, wherein the step of releasing the one or more locks is based in part on the lockout error and the issued rollback.

11. The computer program product of claim 9, wherein the method further comprises the step of based on the amount of the transaction log records being less than the first threshold value, the sum of the costs being less than the second threshold value, and the priority value equaling the predetermined priority value, the computer system determining an optimal time to perform the step of releasing the one or more locks, wherein the step of releasing the one or more locks on the database object is performed at the optimal time.

12. The computer program product of claim 9, wherein the method further comprises:
  the computer system determining the database object is defined with a preemption parameter indicating the utility is permitted to preempt the active units of work using the database so that the utility performs the online processing of the schema,
  wherein the steps of determining the amount of the transaction log records, determining the sum of the costs of the SQL statements, and determining the priority value assigned to the online processing of the schema are performed in response to the step of determining the database object is defined with the preemption parameter.

13. The computer program product of claim 9, wherein the method further comprises the step of based on the lock on the tablespace of the database object being acquired, the computer system preventing a process from accessing the tablespace and (1) performing a read from the database object or (2) performing a write to the database object, wherein the prevented process attempts to access the tablespace to perform a read from the database object or a write to the database object, and wherein the prevented process is other than a process performing the online processing of the schema of the database object.

14. The computer program product of claim 9, wherein the step of determining the amount of the transaction log records includes examining log ranges during which the database object is updated.

15. A computer system comprising:
a central processing unit (CPU);
a memory coupled to the CPU; and
a computer readable storage device coupled to the CPU, the storage device containing instructions that are executed by the CPU via the memory to implement a method of managing an online processing of a schema of a database object, the method comprising the steps of:
  the computer system determining a utility performing the online processing of the schema of the database object is unable to acquire a time period of an exclusive access to the database object for a completion of the online processing of the schema;
  in response to the step of determining the utility is unable to acquire the time period of the exclusive access to the database object, the computer system determining an amount of transaction log records corresponding to active units of work using the database object, and subsequent to the step of determining the amount of transaction log records, the computer system determining the amount of transaction log records is less than a first threshold value;
  in response to the step of determining the utility is unable to acquire the time period of the exclusive access to the database object, the computer system determining a sum of costs of respective SQL statements executed in the active units of work using the database object, and subsequent to the step of determining the sum of the costs, the computer system determining the sum of the costs is less than a second threshold value;

in response to the step of determining the utility is unable to acquire the time period of the exclusive access, the computer system determining a priority value assigned to the online processing of the schema, and subsequent to the step of determining the priority value, the computer system determining the priority value equals the predetermined priority value among a plurality of priority values; and based on the amount of transaction log records being less than the first threshold value, the sum of the costs being less than the second threshold value, and the priority value equaling the predetermined priority value, the computer system (1) acquiring a lock on a tablespace of the database object so that the utility has the lock on the tablespace, (2) based on the acquired lock, releasing one or more locks that respective one or more processes hold on the database object, which provides the utility with the exclusive access to the database object, and (3) determining the utility performs the completion of the online processing of the schema based on the utility having the acquired lock and the exclusive access and based on the one or more locks being released.

16. The computer system of claim 15, wherein the method further comprises the step of subsequent to acquiring the lock, the computer system determining a lockout error on the one or more processes holding the one or more locks on the database object and issuing a rollback of the one or more processes, wherein the step of releasing the one or more locks is based in part on the lockout error and the issued rollback.

17. The computer system of claim 15, wherein the method further comprises the step of based on the amount of the transaction log records being less than the first threshold value, the sum of the costs being less than the second threshold value, and the priority value equaling the predetermined priority value, the computer system determining an optimal time to perform the step of releasing the one or more locks, wherein the step of releasing the one or more locks on the database object is performed at the optimal time.

18. The computer system of claim 15, wherein the method further comprises:
  the computer system determining the database object is defined with a preemption parameter indicating the utility is permitted to preempt the active units of work using the database so that the utility performs the online processing of the schema,
  wherein the steps of determining the amount of the transaction log records, determining the sum of the costs of the SQL statements, and determining the priority value assigned to the online processing of the schema are performed in response to the step of determining the database object is defined with the preemption parameter.

19. The computer system of claim 15, wherein the method further comprises the step of based on the lock on the tablespace of the database object being acquired, the computer system preventing a process from accessing the tablespace and (1) performing a read from the database object or (2) performing a write to the database object, wherein the prevented process attempts to access the tablespace to perform a read from the database object or a write to the database object, and wherein the prevented process is other than a process performing the online processing of the schema of the database object.

20. The computer system of claim 15, wherein the step of determining the amount of the transaction log records includes examining log ranges during which the database object is updated.

* * * * *